United States Patent

[11] 3,602,660

[72] Inventor Russell L. Eslinger
 Philadelphia, Pa.
[21] Appl. No. 27,280
[22] Filed Apr. 10, 1970
[45] Patented Aug. 31, 1971
[73] Assignee Triwees Products, Inc.
 Philadelphia, Pa.

[54] COLLISION RESPONSIVE SWITCH
 8 Claims, 4 Drawing Figs.
[52] U.S. Cl. .................................. 200/61.5
[51] Int. Cl. .................................. H01h 35/14
[50] Field of Search ................... 200/61.45–61.53;
 340/262

[56] References Cited
UNITED STATES PATENTS
3,518,385 6/1970 Boudes et al. ............... 200/61.45

Primary Examiner—Robert K. Schaefer
Assistant Examiner—M. Ginsburg
Attorney—Seidel, Gonda and Goldhammer ABSTRACT: A safety switch for use in a motor vehicle to control the vehicle electrical system. In the event of collision, the vehicle battery will be automatically disconnected from the vehicle electrical system. A trigger mechanism includes a pivotable weight which will move due to the forces of inertia to cause release of a trigger from a plunger mechanism. The plunger mechanism is spring biased to cause disengagement of the vehicle battery with the vehicle electrical system. Upon release of the trigger, the plunger will cause the vehicle electrical system to become inoperative.

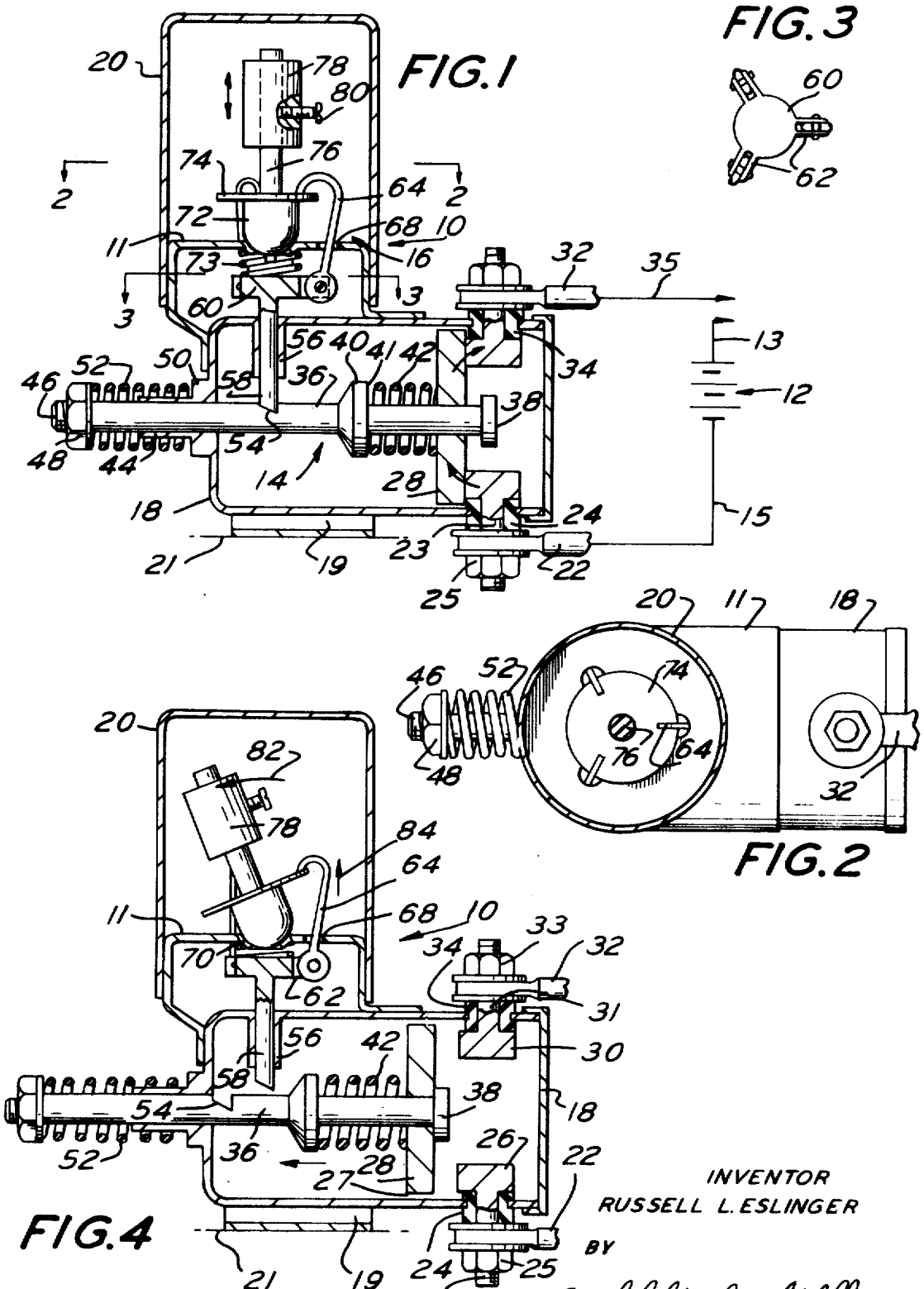

COLLISION RESPONSIVE SWITCH

The present invention is directed to a safety switch and more particularly to a safety switch for use on automotive vehicles or other battery operated vehicles such as boats or the like which will render the vehicle electrical system inoperative should the vehicle become involved in a collision.

It is well known that the vehicles involved in collisions are subject to destruction due to fires resulting from ignition of spilled fuel. The resulting fire not only causes substantial property damage but may also result in severe injury or death to individuals involved in such collisions. It has been recognized that vehicle electrical systems should be rendered inoperative in order to minimize the possibility of fire immediately after a collision.

Safety switches which operate on a principle of inertia have been suggested to render the electrical systems of vehicles inoperative upon collision. However, generally such safety switches have been complex and costly and have therefore not met with general acceptance in the market place.

It is an object of the present invention to provide a safety switch which overcomes the deficiencies of prior art safety switches and will operate reliably and effectively to render the electrical system of a vehicle inoperative immediately after the vehicle has been involved in a collision.

It is another object of the present invention to provide a safety switch which is inexpensive, reliable, and may be mounted on existing vehicles.

It is a further object of the present invention to provide a safety switch which may be easily manually resettable after the switch has been operated to render the electrical system of a vehicle inoperative.

Other objects will appear hereafter.

The above and other objects are accomplished by providing the safety switch of the instant invention. The switch includes a housing and a plunger mechanism mounted in the housing. The switch is directly connected to the battery of the vehicle. The plunger mechanism will be maintained in a normally circuit-closed position to permit operation of the electrical system of the vehicle. A trigger mechanism is mounted in the switch housing. The trigger mechanism includes a trigger which is biased into engagement with the plunger to maintain the plunger in the circuit-closed position. A trigger mechanism includes a trigger which is normally biased into engagement with the plunger mechanism. The trigger has an enlarged head at one end thereof. The enlarged head has three clevises integral therewith. Three hooks have one end thereof received in the clevises.

The trigger mechanism also includes a pivotable weighted member which is mounted on a stem. The pivotable weighted member has a circular flange means associated therewith. The hooks are adapted to engage the circular flange on the pivotable weighted member. A weighted mass is connected to the other end of the stem. The exact position of the weighted mass may be varied in order to vary the impact force necessary to operate the switch.

The trigger is normally spring biased into connection with the plunger mechanism. Should the vehicle be involved in a collision, the weight on the stem will cause pivoting of the pivotable weighted member and will cause one of the hooks to move upwardly through a predetermined distance. The hook will cause the trigger to move upwardly a predetermined distance against the spring bias urging the trigger into engagement with the plunger mechanism. The plunger mechanism will be released. The plunger mechanism is spring biased into a circuit-opening position whereby the electrical system of the vehicle will be rendered inoperative. Upon disengagement of the trigger with the plunger mechanism, the plunger mechanism will be moved to render the electrical system of the vehicle inoperative.

For the purpose of illustrating the invention there is shown in the drawings a form which is presently preferred; it being understood, however, that this invention is not limited to the precise arrangements and instrumentalities shown.

FIG. 1 is a front elevation view, partially in section, of the safety switch of the present invention;

FIG. 2 is a section view taken along lines 2—2 of FIG. 1;

FIG. 3 is a section view taken along lines 3—3 of FIG. 1;

FIG. 4 is a view similar to FIG. 1 showing the safety switch immediately after a collision has occurred.

Referring now the the drawings in detail wherein like numerals indicate like elements throughout the several views there is shown in FIGS. 1–4 a safety switch generally indicated by the reference numeral 10.

The safety switch 10 is connected in series to a battery 12 which provides the source of energy for operation of the electrical system of the vehicle. One cable 13 of the battery 12 is connected to the vehicle electrical system. The other cable 15 of the battery 12 is connected to the safety switch 10.

The safety switch 10 includes a plunger mechanism 14 and a trigger mechanism 16. The plunger mechanism 14 is contained within a housing 18. The housing 18 is preferably secured to a bracket 19. The bracket 19 may be welded to or otherwise secured to the housing 18. Housing 18 includes a housing section 11. The housing section 11 may be either welded or removably secured to the housing 18. Housing 18 includes cap 20 which telescopes over housing section 11. The telescoping cap 20 is maintained in position due to a frictional fit over section 11. The telescoping cap 20 is easily removable from the housing section 11. The bracket 19 may be secured to any fixed surface 21. The fixed surface 21 may be located immediately adjacent the battery 12.

A lead 22 is secured to the battery cable 15. Lead 22 is connected to an electrically conducting stem 23 and is retained in position by a nut or other similar means 25. The lead 22 and stem 23 are electrically isolated from the housing 18 by insulation 24. The stem 23 is connected to or integral with a conducting member 26. The conducting member 26 is adapted to be in electrical contact with a conducting plate 28. An air space 27 is provided for electrically isolating the plate 28 from the housing 18.

The conducting plate 28 is in electrical communication with the conductor member 30. Conductor member 30 may be integral with a stem 31 to which a lead 32 is connected by means of a nut 33 or other securing means. Lead 32 is connected to a cable 35 which communicates with the electrical system of the vehicle. Suitable insulation 34 is provided to prevent electrical connection to the housing 18. It is deemed readily apparent that the electrical systems of the vehicle will be operative so long as the plate 28 remains in electrical communication with the conducting members 26 and 30. Flow of electricity will occur in the direction of the arrows in FIG. 1.

The plunger mechanism 14 includes a plunger 36 which may be made of nonconductive material. The plunger 36 includes an enlarged circular head 38 at one end thereof. A flange 40 may be connected to or formed integrally with the plunger 36. The flange 40 provides a surface 41 which is adapted to be engaged by a compression spring 42. Compression spring 42 is also adapted to bear against conducting plate 28.

The housing 18 has a sleeve 44 formed therewith. The plunger 36 extends through sleeve 44 and has a threaded end 46 thereon. The threaded end 46 is adapted to receive a nut 48. The housing 18 also includes a reaction surface 50 thereon. A compression spring 52 is adapted to act against the reaction surface 50 and the nut 48 and urge the plunger 36 towards the left as viewed in FIGS. 1 and 4. Compression spring 42 also urges plunger 36 towards the left as viewed in FIGS. 1 and 4. Plunger 36 is provided with a notch 54 therein for receiving the trigger 58 of the trigger mechanism 16.

The housing 18 includes a sleeve 56 for guiding the trigger 58. The trigger 58 is provided with an enlarged circular flat head 60. The head 60 includes a plurality of clevises 62 formed integrally therewith. In a preferred form of the invention, three such clevises are provided. The clevises are equidistantly spaced about the head 60. Each clevis 62 is adapted to receive one end of a hook 64. The hooks 64 may be connected to the clevises 62 by means of pins so that the hooks 64 are permitted to rotate with respect to the clevises 62. Any other suitable securing means may be utilized for securing the hooks 64 to the head 60.

The hooks 64 extend upwardly through openings 68 in the housing section 11. The housing section 11 is provided with a seat 70. The seat 70 is adapted to receive a semielliptical weighted member 72. The member 72 has a circular flange 74 on the uppermost end thereof. The uppermost ends of hooks 64 are adapted to engage the flange 74 on the member 72 as shown in FIG. 2. A compression spring 73 is seated between the head 60 and the housing section 11. The spring engages the underside of the seat 70.

The member 72 is mounted on a stem 76. The member 72 may be formed integrally with the stem 76. The uppermost end of the stem 76 is provided with a weighted mass 78. The exact location of the weighted mass 78 may be varied as desired. To this end, a set screw 80 is provided for permitting movement of the mass 78 to a desired position. Varying the exact location of the mass 78 will permit varying the amount of impact required to actuate the safety switch 10.

The compression spring 73 urges the trigger 58 into engagement with the bore 54 of the plunger 36. The compression springs 42 and 52 urge the plunger to the left as viewed in FIGS. 1 and 4. Should the vehicle in which the safety switch 10 is mounted be involved in a collision, the force of inertia would cause the mass 78, member 72 and structure associated therewith to pivot about the axis of the trigger 58. Arrow 82 in FIG. 4 is exemplary of the pivoting motion which may occur. The pivoting movement will cause at least one portion of the flange 74 to move upwardly thus drawing the hook 64 associated therewith upwardly as exemplified by arrow 84 in FIG. 4. Movement of the hook 64 upwardly will cause compression of spring 73 and upward movement of trigger 58. Trigger 58 will be withdrawn from the bore 54 of plunger 36 to thereby permit the springs 42 and 52 to move the plunger 36 to the left into the position shown in FIG. 4.

A collision will operate the safety switch 10 without regard to the direction of the impact. The hooks 64 are spaced 120 arcuate degrees apart around head 60. Hence, the switch 10 will be operative when the mass 78 and its associated structure moves any direction.

Movement of the plunger 36 will cause the head 38 to engage the plate 28 and move the same to the left with the plunger 36. Movement of the plate 28 will cause a break in the electrical system of the vehicle because lead 32 will be electrically isolated from lead 22. Hence, all electrical systems in the vehicle will be rendered inoperative thus minimizing the possibility of a spark which could cause ignition of spilled fuel.

The switch 10 may be readily manually reset by removing the telescoping cap 20, placing the mass 78 and structure associated therewith in a substantially vertical position and pushing the plunger against the action of springs 42 and 52 until the trigger 58 seats within the bore 54. It is also possible to provide automatic means operable within the vehicle for resetting the safety switch after the same has been operated. However, no such automatic means has been shown in the instant application.

The present invention may be embodied in other specific forms without departing from the spirit or essential attributes thereof and, accordingly, reference should be made to the appended claims, rather than to the foregoing specification as indicating the scope of the invention.

I claim:

1. A safety switch for use in a motor vehicle wherein the switch is adapted to render the vehicle electrical system inoperative should the vehicle become involved in a collision comprising a housing, a plunger mechanism mounted in said housing, a trigger mechanism mounted in said housing, said trigger mechanism including a trigger biased into engagement with said plunger mechanism to maintain said plunger mechanism against movement, said trigger having an enlarged head at one end thereof, hook means connected to said enlarged head, said trigger mechanism including a pivotable weighted member and a stem, said pivotable weighted member being mounted on one end of said stem, said pivotable weighted member having a flange means, a weighted mass being mounted on said stem adjacent the other end thereof for pivotal movement by reason of its inertia during collision, said hook means cooperating with said flange means to move said trigger against its bias and out of engagement with said plunger mechanism upon pivoting of said weighted mass and said pivotable weighted member through a predetermined arc during collision thereby releasing said plunger mechanism for movement and rendering the electrical system of the vehicle inoperative.

2. A safety switch as set forth in claim 1 wherein said hook means includes three hooks equally spaced about said enlarged head, each of said hooks engaging the flange means associated with the pivotable weighted member, said flange means being a circular plate integral with said pivotable weighted member.

3. A safety switch as set forth in claim 1 wherein said hook means is supported by clevises formed integrally with said enlarged head, said housing including a seat for said pivotable weighted member, a spring located between said seat and said enlarged head to urge said trigger into engagement with said plunger mechanism, whereby movement of said pivotable weighted member will cause said enlarged head on said trigger to compress said spring to thereby move said trigger out of engagement with said plunger mechanism.

4. A safety switch as set forth in claim 1 wherein said plunger mechanism includes a plunger spring urged into a position wherein said electrical system of the vehicle will be rendered inoperative, said plunger having a bore therein, said trigger being received in the bore of said plunger.

5. A safety switch as set forth in claim 4 wherein two compression springs are utilized to urge said plunger into a position rendering the electrical system of the vehicle inoperative, and the position of said weighted mass being adjustable on said stem.

6. A safety switch as set forth in claim 1 wherein said housing includes a housing section and a telescoping cap portion frictionally engaging said housing section, said telescoping cap portion being removable to permit access to said pivotable weighted member, said stem and said weighted mass.

7. A safety switch as set forth in claim 1 wherein the electrical system includes a battery, one cable of the battery being adapted to be connected to the safety switch, said cable being electrically insulated from the housing, and said pivotable weighted member being semieliptical in shape and being seated in a seat provided in said housing.

8. A safety switch as set forth in claim 1 wherein said plunger mechanism has an enlarged end thereon, means whereby said enlarged end causes movement of a conducting member to break a circuit when said trigger releases said plunger mechanism to render the electrical system of the vehicle inoperative.